J. D. Leach.
Navigator's Bearing Indicator.

№ 102,281. Patented Apr. 26, 1870.

Witnesses
Herbert J. Whitman
H. K. Porter

Inventor
J. D. Leach
By T. W. Porter Atty

United States Patent Office.

JOSEPH D. LEACH, OF PENOBSCOT, MAINE.

Letters Patent No. 102,281, dated April 26, 1870.

IMPROVEMENT IN NAVIGATORS' BEARING-INDICATOR.

The Schedule referred to in these Letters Patent and making part of the same.

*To all whom it may concern:*

Be it known that I, JOSEPH D. LEACH, of Penobscot, in the county of Hancock and State of Maine, have invented a new and useful Improvement in Navigators' Bearing-Indicators; and I do hereby declare that the following, taken in connection with the drawings which accompany and form part of this specification, is a description of my invention sufficient to enable those skilled in the art to which it appertains to practice it.

This invention relates to an improvement upon the navigators' bearing-indicator patented by myself on the 6th day of July, A. D. 1869; and The invention consists in surrounding the compass with an index, which is rigidly attached to the compass-box, for the purpose of facilitating the determination of the bearing of any object, as will be hereinafter more fully explained; and, also, in combining a telescope with the indicator, for the purpose of sighting objects by which the course is being shaped.

Figure 1:
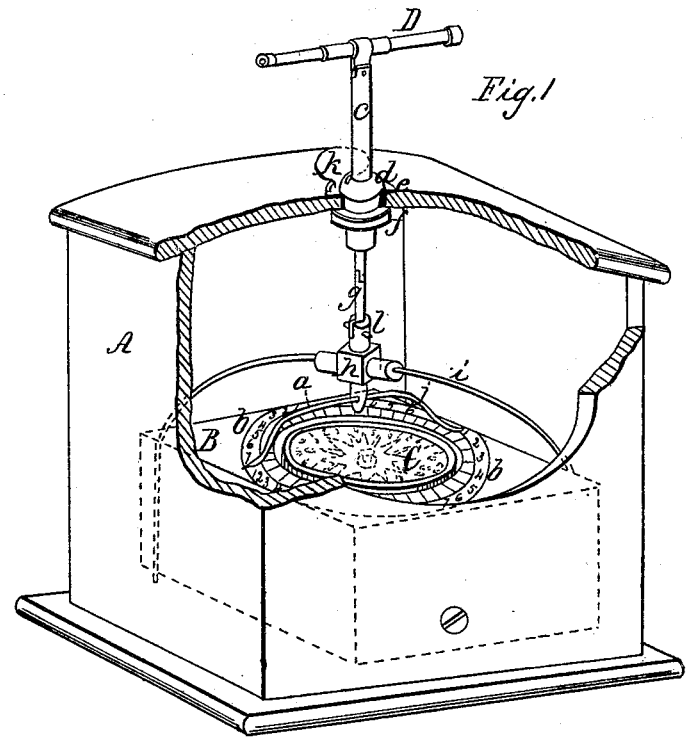
Figure 2:
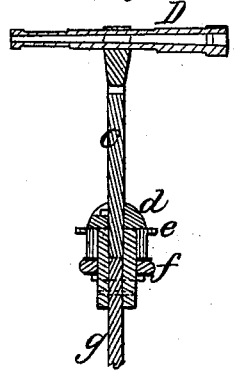

Figure 1 is a perspective view of my invention applied to a compass and indicator, and Figure 2 is a vertical section taken longitudinally through the telescope.

Similar letters of reference indicate like parts in the several figures.

In the drawings—

A represents the binnacle, a portion of which is broken away to show the interior arrangements;

B is the compass-box; and

C is the compass-card, while $b$ $b$ is the circular index which surrounds tha compass-card, as shown.

This index is divided into thirty-two spaces, and numbered as shown, to wit, commencing at the lubber-mark, so called, at $a$; thence round each way to 8; commencing again at 1 on each side, and meeting again at 8 on the side of the circle opposite the lubber-mark, or at the point nearest the stern of the vessel.

D represents the telescope, of usual construction, which is pivoted in rod C, this rod being inserted at will in the hub $d$. A pin in the rod fitting into a slot in the hub, as shown, insures the proper position of the telescope relatively to the hub. This hub revolves freely in the bushing $e$, which is secured in the top of the binnacle.

$g$ is a rod secured in the lower end of hub $d$, and to the lower end of this rod is secured the enlarged piece $l$, which latter revolves freely in hub $h$, this hub being held in position by bail $i$, secured to the compass-box.

In the lower end of hub $l$ is secured the bent arm $j$, the outer ends of which traverse the circuit of the index $b$ $b$.

By the use of the telescope D the mariner is enabled to discern objects at greater distances and with greater certainty, and by the aid of the index $b$ $b$ the indicating-arm $j$ is brought close down to the figures on the index, regardless of the movements of the compass in rough weather, and the navigator is enabled to note exactly on the index $b$ the bearing of the object, by which he is shaping his course, from the ship, while the compass-card indicates, with equal certainty, the relative position of itself with the numbers on the index, so that the bearing of the object is as accurately determined as if the conpass were always quiet and the pointer $j$ were brought close to the card.

Having thus described my invention.

What I claim as new, and desire to secure by Letters Patent, is—

In combination with the bearing-indicator, consisting of the vertical shaft $e$, the sighting device or telescope D, the pointer $j$, the case A, and the mariners' compass C, and the stationary graduated index-card $b$, arranged substantially as described.

JOSEPH D. LEACH.

Witnesses:
C. L. MARSTON,
J. H. DODY.